(12) United States Patent
Min et al.

(10) Patent No.: US 9,069,211 B2
(45) Date of Patent: Jun. 30, 2015

(54) METHOD AND APPARATUS OF ALIGNING ALIGNMENT LAYER, AND METHOD OF MANUFACTURING LIQUID CRYSTAL DISPLAY USING THE SAME

(75) Inventors: Cheong-Wan Min, Cheonan-si (KR); Jeamin Lee, Asan-si (KR); Jaeil Kim, Asan-si (KR); BongSung Seo, Yongin-si (KR)

(73) Assignee: Samsung Display Co., Ltd., Yongin, Gyeonggi-do (KR)

( * ) Notice: Subject to any disclaimer, the term of this patent is extended or adjusted under 35 U.S.C. 154(b) by 696 days.

(21) Appl. No.: 13/228,911

(22) Filed: Sep. 9, 2011

(65) Prior Publication Data

US 2012/0154769 A1 Jun. 21, 2012

(30) Foreign Application Priority Data

Dec. 15, 2010 (KR) ........................ 10-2010-0128408

(51) Int. Cl.
*G02F 1/1337* (2006.01)
*G02F 1/13* (2006.01)
*H01L 21/00* (2006.01)

(52) U.S. Cl.
CPC ........ *G02F 1/133788* (2013.01); *G02F 1/1303* (2013.01); *G02F 1/133753* (2013.01)

(58) Field of Classification Search
CPC ............ G02F 1/1303; G02F 1/133753; G02F 1/133788
USPC .............................. 349/124, 129, 187; 438/30
See application file for complete search history.

(56) References Cited

U.S. PATENT DOCUMENTS

| 7,133,099 B2 | 11/2006 | Yoshida et al. | |
| 7,251,001 B2 * | 7/2007 | Chida et al. | 349/124 |
| 2005/0088730 A1 * | 4/2005 | Sangu et al. | 359/362 |
| 2008/0187870 A1 * | 8/2008 | Shin et al. | 430/321 |
| 2009/0279044 A1 * | 11/2009 | Hakoi et al. | 349/187 |

FOREIGN PATENT DOCUMENTS

| KR | 10-2008-0073549 | 8/2008 |
| KR | 10-2010-0072682 | 7/2010 |
| KR | 10-2011-0039899 | 4/2011 |
| KR | 10-2011-0095571 | 8/2011 |

OTHER PUBLICATIONS

English Abstract for Publication No. 10-2008-0073549.
English Abstract for Publication No. 10-2010-0072682.

* cited by examiner

*Primary Examiner* — Paisley L Arendt
(74) *Attorney, Agent, or Firm* — F. Chau & Associates LLC

(57) ABSTRACT

A method of aligning an alignment layer of a liquid crystal display (LCD) includes positioning a substrate on a stage; the substrate having the alignment layer provided thereon and the alignment layer including a plurality of alignment regions. Data identifying positions of the alignment regions relative to the alignment layer are loaded. A control signal for controlling a supply of light based on the loaded data identifying the positions of the alignment regions is generated. The light is supplied to the alignment regions according to the control signal and the alignment regions are aligned. The light is supplied from at least two different angles of incidence so that the alignment regions are aligned in at least two different directions.

10 Claims, 20 Drawing Sheets

METHOD AND APPARATUS OF ALIGNING ALIGNMENT LAYER, AND METHOD OF MANUFACTURING LIQUID CRYSTAL DISPLAY USING THE SAME

CROSS-REFERENCE TO RELATED APPLICATION

This application relies for priority upon Korean Patent Application No. 10-2010-0128408 filed on Dec. 15, 2010, the contents of which are herein incorporated by reference in their entirety.

BACKGROUND

1. Field of Disclosure

The present invention relates to a liquid crystal display. More particularly, the present invention relates to a method and an apparatus of aligning an alignment layer and a method of manufacturing a liquid crystal display using the same.

2. Discussion of the Related Art

In general, a liquid crystal display (LCD) includes a first substrate, a second substrate facing the first substrate, and a liquid crystal layer interposed between the first and second substrates. The LCD adjusts the transmittance of a light through the liquid crystal layer according to an electric field applied thereto to display an image.

However, since the LCD transmits light only in a specific direction according to the alignment directions of liquid crystal molecules of the liquid crystal layer, the LCD represents a viewing angle narrower than that of other types of display apparatuses.

Accordingly, some LCD devices divide a region of an alignment layer corresponding to one pixel into a plurality of domains and each of these domains is aligned in a different direction to widen the viewing angle. The alignment of the divided alignment layer is performed using a mask. However, when the alignment layer is aligned by using the mask, the manufacturing cost of the LCD device is increased, and the manufacturing process is complicated.

SUMMARY

Exemplary embodiments of the present invention provide a method and an apparatus of aligning an alignment layer without a mask.

Exemplary embodiments of the present invention provide a method of manufacturing a liquid crystal display using the same.

A method of aligning an alignment layer of an LCD according to an embodiment of the present invention is as follows.

A method of aligning an alignment layer of a liquid crystal display (LCD) includes positioning a substrate on a stage; the substrate having the alignment layer provided thereon and the alignment layer including a plurality of alignment regions. Data identifying positions of the alignment regions relative to the alignment layer are loaded. A control signal for controlling a supply of light based on the loaded data identifying the positions of the alignment regions is generated. The light is supplied to the alignment regions according to the control signal and the alignment regions are aligned. The light is supplied from at least two different angles of incidence so that the alignment regions are aligned in at least two different directions.

A substrate, which is provided thereon with the alignment layer includes a plurality of alignment regions, is aligned on a stage. Data about positions of the alignment regions, to which a light is supplied, are loaded, and a control signal corresponding to the data is generated. Thereafter, the light is supplied to the alignment regions according to the control signal to align the alignment regions in at least two different directions.

An apparatus for aligning an alignment layer according to an exemplary embodiment of the present invention includes a light source to generate a light, a stage, a data processor, and an optical part.

The stage receives a substrate provided thereon with the alignment layer including a plurality of alignment regions. The data processor loads data about positions of the alignment regions, to which a light is supplied, and generates a control signal corresponding to the data. The optical part receives the control signal and the light to selectively supply the light to the alignment regions of the alignment layer.

A method of manufacturing a liquid crystal display according to an exemplary embodiment of the present invention is as follows. A first alignment layer formed on a first substrate including a plurality of thin film transistors is aligned. A second substrate including a plurality of color filters and a second alignment layer provided on the color filters is prepared. The first substrate is bonded with the second substrate while interposing a liquid crystal layer between the first and second substrates The method of aligning the first alignment layer is as follows. The first substrate, which includes the first alignment layer including a plurality of first alignment regions, is aligned on a stage. Data about positions of the first alignment regions, to which a light is supplied, is loaded, and a control signal corresponding to the data is generated. The light is supplied to the first alignment regions according to the control signal to align the first alignment regions in at least two different directions.

According to the above, the alignment layer is aligned without the mask in at least two different directions, so that the viewing angle of the LCD can be widened without increasing the manufacturing cost and making the manufacturing process complex.

BRIEF DESCRIPTION OF THE DRAWINGS

The above and other aspects of exemplary embodiments of the present invention will become readily apparent by reference to the following detailed description when considered in conjunction with the accompanying drawings wherein.

DETAILED DESCRIPTION

Figure 1:
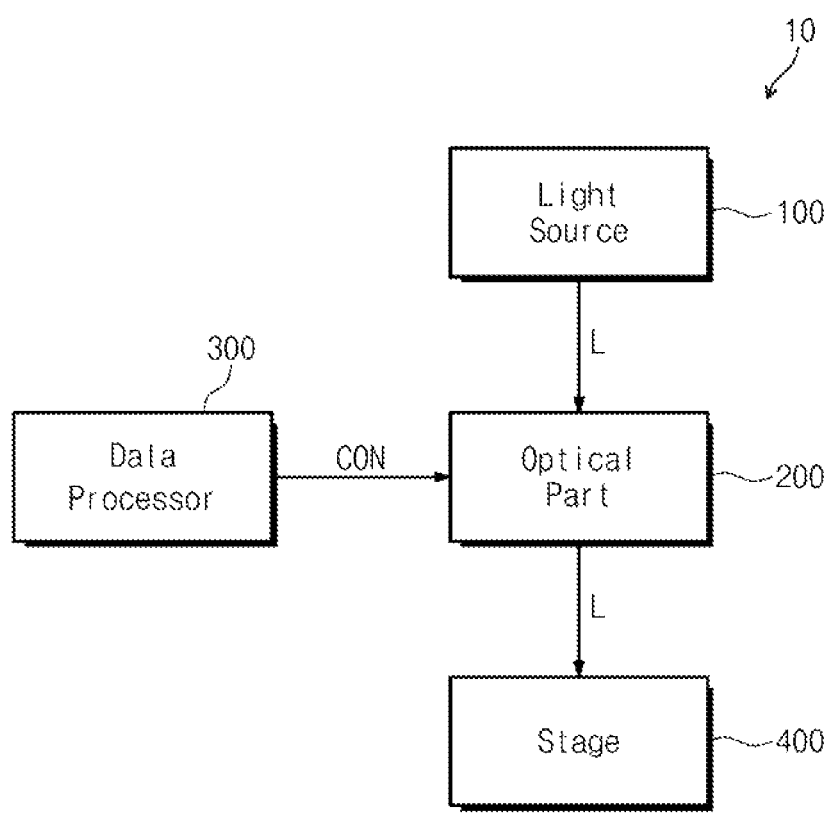
FIG. 1 is a block diagram showing an alignment apparatus according to an exemplary embodiment of the present invention.

Hereinafter, exemplary embodiments of the present invention will be described in detail with reference to accompanying drawings. However, the present invention is not limited to the following embodiments but includes various changes, substitutions and modifications of the discussed embodiments.

In the drawings, the sizes of layers and regions may be magnified for the purpose of clear explanation. The terms "first", "second" and the like may be used to explain various elements but the elements are not limited to such terms. The terms are used to distinguish elements from each other. Thus, an element referred to as a first element in one portion of the disclosure may be referred to as a second element in another portion of the disclosure. It will be understood that when an element, such as a layer, a film, a region, or a plate, is referred to as being 'on' or 'under' another element, the element can be directly on another element or intervening element may also be present therebetween.

Hereinafter, exemplary embodiments of the present invention will be described in more detail with reference to accompanying drawings.

FIG. 1 is a block diagram showing an alignment apparatus 10 according to an exemplary embodiment of the present invention.

Referring to FIG. 1, the alignment apparatus 10 includes a data processor 300, a light source 100, an optical part 200, and a stage 400.

The light source 100 generates a light L and supplies the light L to the optical part 200. The light source 100 may include a laser emitting a laser beam. The light L may be a UV light, for example, a linearly-polarized UV light.

The optical part 200 receives a control signal CON from the data processor 300 and the light L from the light source 100. The optical part 200 selectively supplies the light L to alignment regions of an alignment layer, so that the alignment regions are aligned in at least two different directions. Although not shown in FIG. 1, the optical part 200 may include a digital micro-mirror apparatus and a lens apparatus to selectively supply the light L to the alignment regions.

The data processor 300 receives data about the alignment positions and alignment direction of the alignment layer to generate data about the positions of the alignment regions so that the alignment regions can receive the light L. Thereafter, the data processor 300 loads the data about the position of the alignment regions, to which the light L is supplied, to generate the control signal CON, which corresponds to the data and is used to control the optical part 200, and transmit the control signal CON to the optical part 200.

The stage 400 receives a substrate provided thereon with the alignment layer having the alignment regions and moves the substrate when the alignment layer is aligned. The details of the stage 400 will be described with reference to accompanying drawings.

According to an exemplary embodiment, when the alignment layer is aligned, the light L may be continuously supplied or may be intermittently supplied by repeatedly turning on and off a light source controller (not shown).

Figure 2:
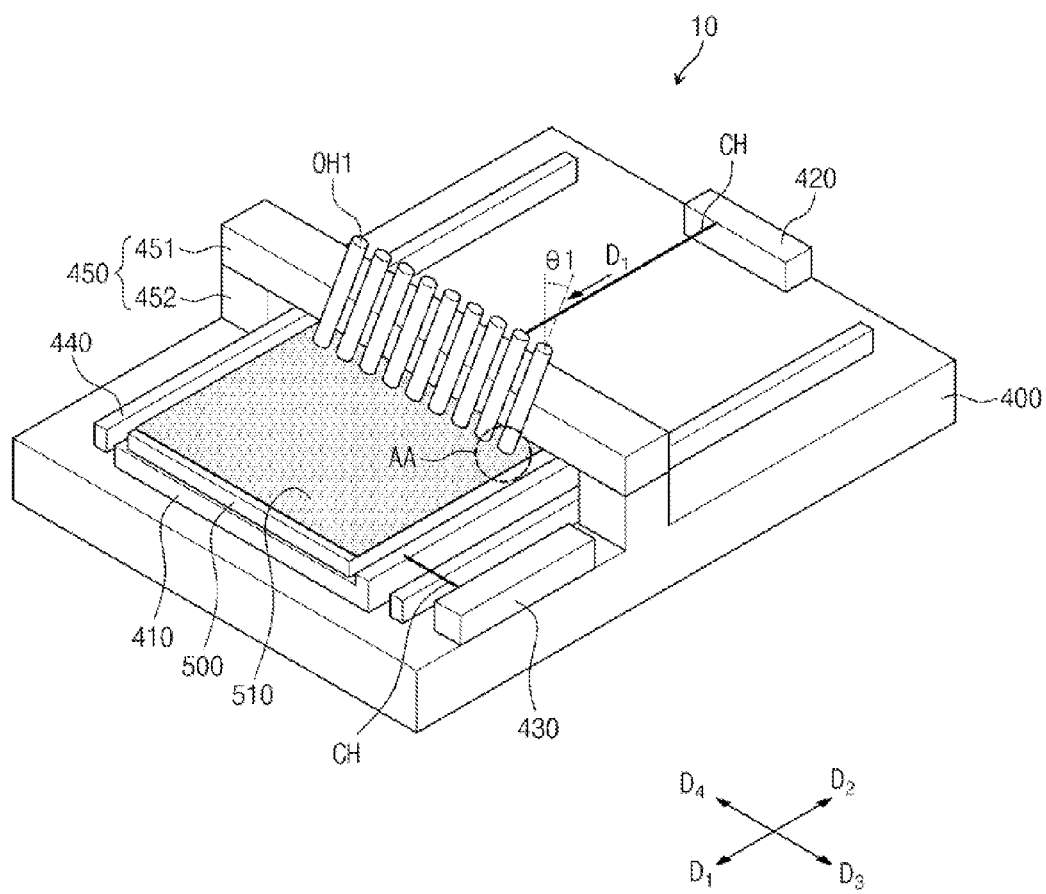
FIG. 2 is a perspective view showing the alignment apparatus according to an exemplary embodiment of the present invention.

FIG. 2 is a perspective view showing the alignment apparatus 10 according to an exemplary embodiment of the present invention.

Referring to FIG. 2, the alignment apparatus 10 includes the stage 400, a plurality of first optical heads OH1, and a first support part 450.

The stage 400 includes a transfer part 410 to transfer a substrate 500, a guide part 440 to guide the substrate 500 and the transfer part 410 when the substrate 500 is transferred, a first position adjusting part 420 to adjust the position of the substrate 500 in a first direction D1 and/or a second direction D2 (which is an opposite direction to D1), and a second position adjusting part 430 to adjust the position of the substrate 500 in a third direction D3 and/or a fourth direction D4 (which is an opposite direction to D2). The directions D3 and D4 are substantially perpendicular to the directions D1 and S2. The transfer part 410 and the first position adjusting part 420, or the transfer part 410 and the second position adjusting part 430 may be linked with each other by using a string or a chain CH.

When the substrate 500 is positioned in the transfer part 410 of the stage 400, the position of the substrate 500 is aligned by adjusting the first and second position adjusting parts 420 and 430 such that an alignment layer 510 on the substrate 500 can be aligned.

The stage 400 transfers the substrate 500 such that the substrate 500 passes through the optical heads OH1. In this case, the stage 400 transfers the substrate 500 at a proper speed such that the alignment layer 510 on the substrate 500 can be aligned by a light supplied from the first optical heads OH1.

Although not shown, the substrate 500 may include an array substrate having a switching device or a color filter substrate having a color filter. The details of the substrate 500 will be described with reference to FIGS. 8 to 10 below.

The first support part 450 includes a first horizontal support part 451 to which the first optical heads OH1 are fixed and a first vertical support part 452 to support the first horizontal support part 451 such that the first horizontal support part 451 is spaced apart from the stage 400 by a predetermined distance. The first support part 450 may include a connection device to supply a control signal from an external source to the first optical heads OH1.

The first optical heads OH1 are provided on the first horizontal support part 451 in such a manner that the first optical heads OH1 are inclined at a first angle θ1 with respect to a line normal to a top surface of the alignment layer 510. For example, each optical head OH1 is inclined at the first angle θ1 in the first direction D1 to supply a light in the first direction D1. The first angle θ1 may be in the range of 20° to 50°, for example within the range of 30° to 40°, and for example, the angle θ1 may be substantially equal to 35°.

The light output from the first optical heads OH1 may have a wavelength of about 80 nm to about 400 nm and an intensity of a few mW to a few tens of mW (e.g. 2 mW to 40 mW). Accordingly, the light may have various wavelengths and intensities according to the type of the alignment layer.

The alignment layer 510 may include a photo-functional group including at least one selected from the group consisting of cinnamate, cumarine, and chalcone and may be exposed by the light supplied from the first optical heads OH1 and aligned thereby.

Although not shown in FIG. 2, each first optical head OH1 may include a light source to generate a light and an optical part to selectively supply the light according to the alignment regions of the alignment layer 510. According to an exemplary embodiment, a plurality of optical heads may receive a light from one light source. In this case, the optical heads may be connected to the light source through an optical fiber.

Although FIG. 2 shows that the alignment layer 510 is aligned while moving the substrate 500, the alignment layer 510 may alternatively be aligned while moving the first optical heads OH1 in a state that the substrate 500 is fixed.

Figure 3:
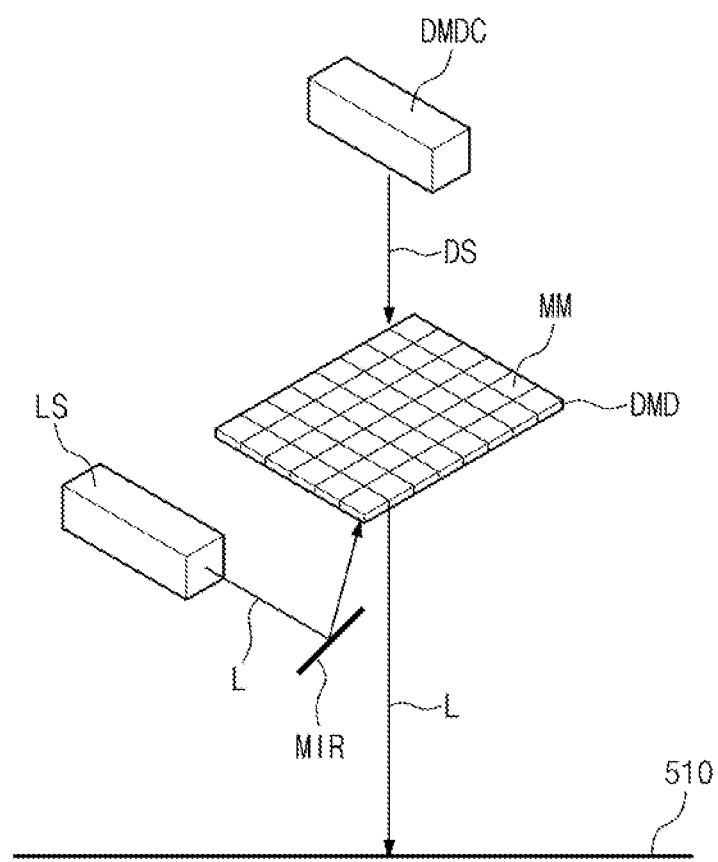
FIG. 3 is a view showing an example of first optical head of FIG. 2.

FIG. 3 is a view showing an example of the first optical heads OH1 of FIG. 2.

The first optical head OH1 includes a light source LS, a digital micromirror device DMD, and a digital micromirror device controller DMDC.

A light L generated from the light source LS is supplied to the digital micro-mirror device DMD. At least one mirror MIR may be interposed between the light source LS and the digital micromirror device DMD. The mirror MIR may supply the light L incident thereon from the light source LS to the digital micromirror device DMD by changing the path of the light L.

The digital micromirror device controller DMDC receives the control signal CON from the data processor 300 and transmits a driving signal DS to drive the digital micromirror device DMD.

The digital micromirror device DMD includes a plurality of micromirrors MM arranged in the form of a matrix and operates the micromirrors MM according to the driving signal DS. For example, the micromirrors MM have a surface including a material, such as aluminum, having high reflectance and each micromirror is tilted at an inclination angle within the range of +10° to −10°, so that the light L incident from the light source LS is selectively supplied to the alignment layer 510.

Although FIG. 3 shows the digital micromirror device DMD as an apparatus to irradiate a light to the alignment regions of the alignment layer 510, a digital apparatus, which is generally known to those skilled in the art, may alternatively be used to irradiate a light to a specific region of the alignment layer 510.

Figure 4A:
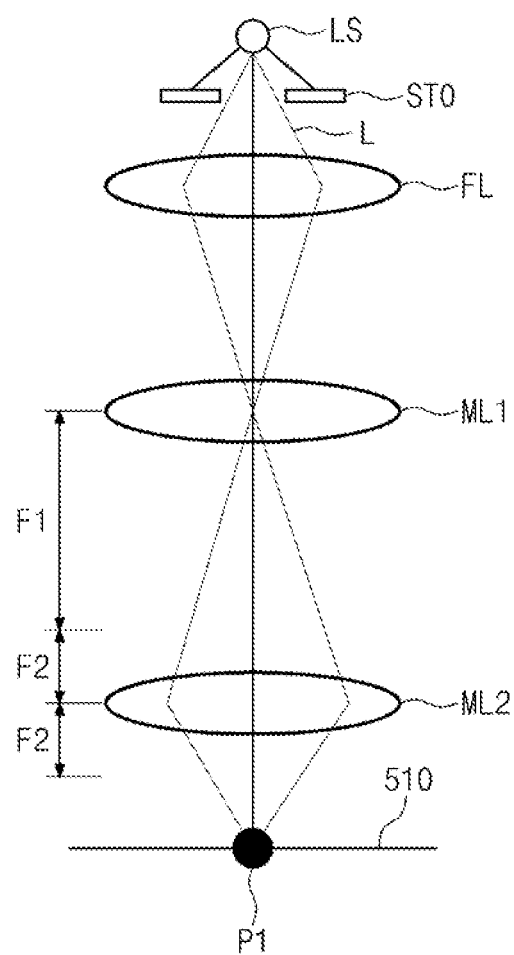
FIGS. 4A to 4C show an example of the first optical heads of FIG. 2 and a method of driving the same.
Figure 4B:
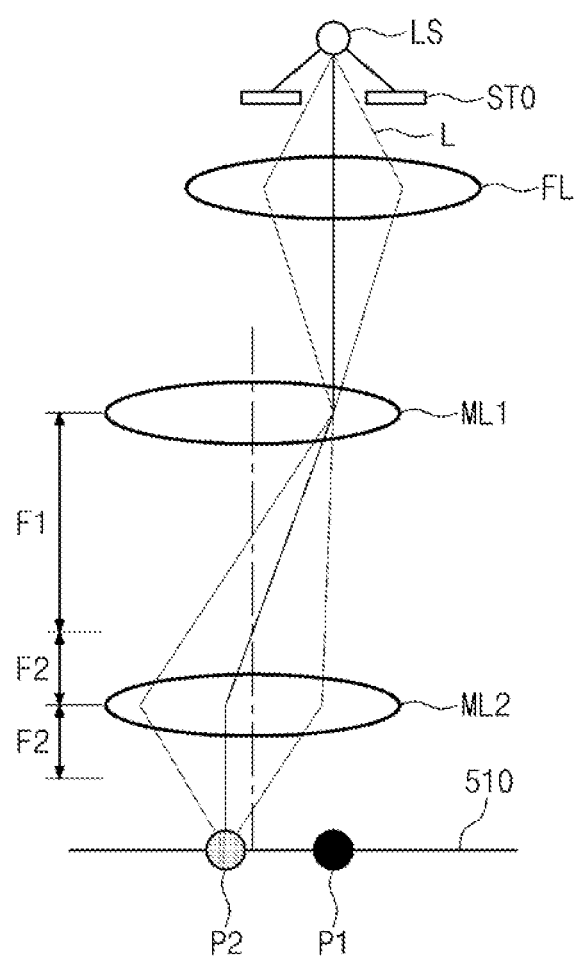
Figure 4C:
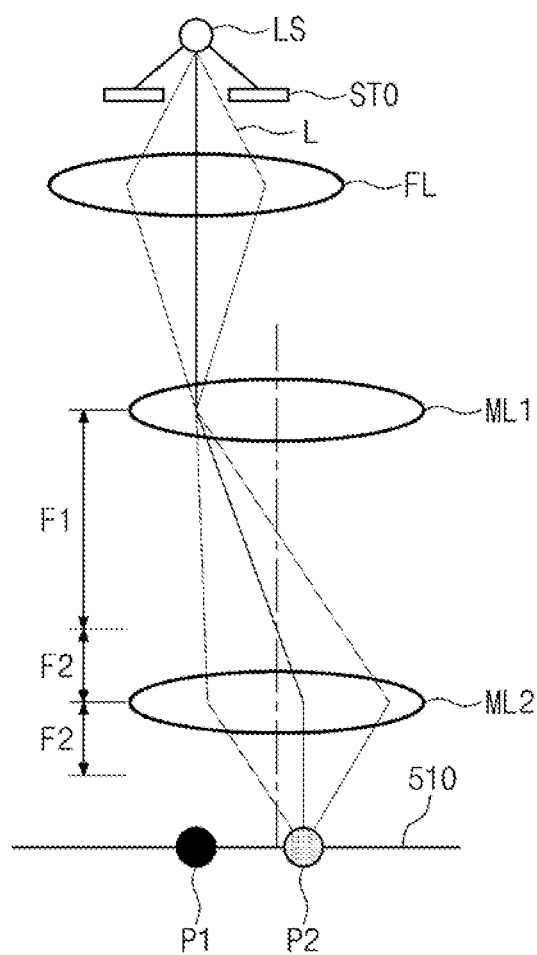

FIGS. 4A to 4C show an example of the first optical heads of FIG. 2 and a method of driving the same.

The first optical heads OH1 includes the light source LS, an optical stopper STO, a fixed lens FL, a first movable lens ML1, and a second movable lens ML2.

Although not shown in FIGS. 4A to 4C, the first optical head OH1 may further include a light source controller. The light source controller receives a part of the control signal CON supplied from the data processor 300 to transmit a light source driving signal for adjusting on/off timing of the light source LS. The light source LS outputs light according to the light source driving signal.

The optical stopper STO blocks light output from the light source LS from being supplied to an undesired position. The optical stopper STO allows the light to be supplied only to the fixed lens FL.

The fixed lens FL receives the light L from the light source LS to supply the light L to the first movable lens ML1. Although not shown, the first optical head OH1 may further include a lens controller capable of controlling the movement of the first and second movable lenses ML1 and ML2. The lens controller receives a part of the control signal CON from the data processor 300 to control the movement of the first and second movable lenses ML1 and ML2.

The first movable lens ML1 is provided below the fixed lens FL to receive the light L passing through the fixed lens FL and transmit the light L to the second movable lens ML2. The first movable lens ML1 is spaced apart from the fixed lens FL by a predetermined distance such that the light L passing through the fixed lens FL is collected onto the first movable lens ML1.

The second movable lens ML2 is provided below the first movable lens ML1 to receive the light L passing through the first movable lens ML1 and transmit the light L to the alignment layer 510. The second movable lens ML2 may be positioned in such a manner that a distance between the first and second movable lenses ML1 and ML2 is longer than a focal length F1 of the first movable lens ML1. The sum of the focal lengths F1 and F2 of the first and second movable lenses ML1 and ML2 may be identical to the distance between the first and second movable lenses ML1 and ML2.

In addition, the second movable lens ML2 is positioned in such a manner that a distance between the second movable lens ML2 and the alignment layer 510 is longer than the focal length F2 of the second movable lens ML2.

Referring to FIG. 4A, when the light L is supplied to a first position P1, from a corresponding light source LS, when viewed in a plan view, the centers of the first and second movable lenses ML1 and ML2 are aligned in line with the first position P1. In this case, since the light L1 reaching the first movable lens M1 through the fixed lens FL passes through the center of the first movable lens ML1, the light L 1 is not refracted. Then, the light L passing through the second movable lens ML2 is supplied to the first position P1.

Referring to FIG. 4B, when the light L1 is supplied to a second position P2 to the left of the first position P1, the first and second movable lenses ML1 and ML2 are moved to the left. In this case, the light L passing through the first movable lens ML1 is refracted toward the second position P2, and the light L passing through the second movable lens ML2 is supplied to the second position P2.

Referring to FIG. 4C, when the light L1 is supplied to a third position P3 to the right of the first position P1, the first and second movable lenses ML1 and ML2 are moved to the right. In this case, the light L passing through the first movable lens ML1 is refracted toward the third position P3, and the light L passing through the second movable lens ML2 is supplied to the third position P3.

In such a manner, the first optical head of FIGS. 4A to 4C can supply the light L to a desired position.

Figure 5:
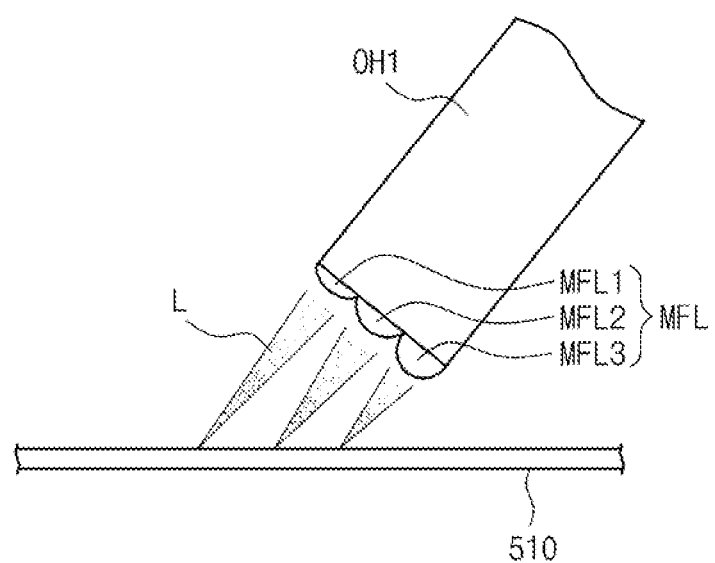
FIG. 5 is an enlarged view showing a part "AA" of FIG. 2.

FIG. 5 is an enlarged view showing a part "AN" of FIG. 2. For the purpose of explanation, FIG. 5 is shown as a sectional view.

The first optical head OH1 may further include a multi-focal lens MFL to supply the light L.

The first optical head OH1 is inclined with respect to the top surface of the alignment layer 510, and the light L is supplied in the inclination direction with respect to the top surface of the alignment layer 510. Accordingly, the light L output from the first optical head OH1 is not focused on the alignment layer 510. Therefore, in the multi-focal lens MFL, a first part MFL1 installed at the first optical head OH1 farthest from the alignment region has a longest focal length, a second part MFL2 installed at the first optical head OH1 closest to the alignment region has a shortest focal length, and a third part MFL3 installed at the first optical head OH1 with an intermediate distance with respect to the alignment region has an intermediate focal length.

For example, the multi-focal lens MFL includes microlenses (not shown) as many as the number of the micromirrors MM provided at the digital micromirror device DMD to adjust the focal length.

Figure 6:
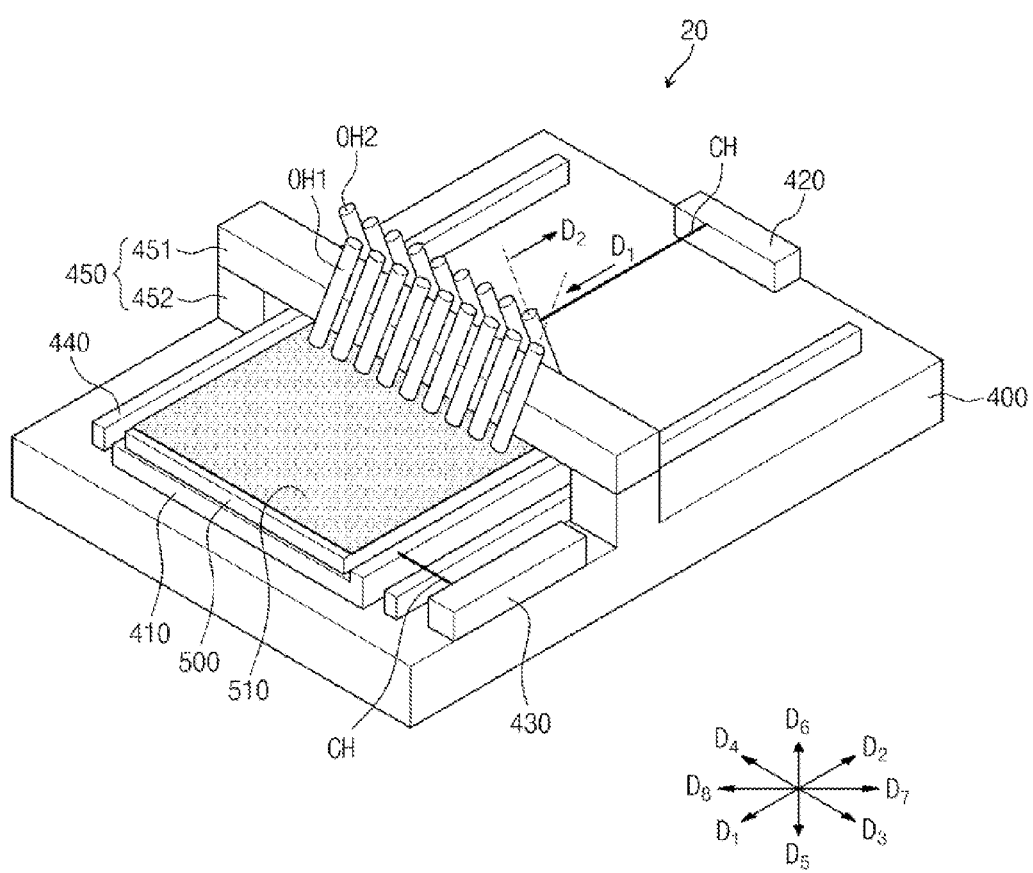
FIG. 6 is a perspective view showing an alignment apparatus according to an exemplary embodiment of the present invention.

FIG. 6 is a perspective view showing an alignment apparatus 20 according to an embodiment of the present invention.

Hereinafter, the alignment apparatus 20 will be described in detail. The same reference numbers will be assigned to the structure and components identical to those of FIG. 2.

The alignment apparatus 20 further includes a plurality of second optical heads OH2. The optical heads OH2 are fixed to a side of the first horizontal support part 451 opposite to the side that the optical heads OH1 are fixed to. Each second optical head OH2 is inclined in the second direction D2 to supply the light L in the second direction D2. The inclination angle of each second optical head OH2 may be identical to or different from that of the first optical heads OH1.

Since the alignment apparatus 20 includes the first and second optical heads OH1 and OH2 to supply the light L inclined in the first and second directions D1 and D2, the alignment apparatus 20 can align the alignment layer 510 in the first and second directions D1 and D2 when the substrate 500 passes through the first and second optical heads OH1 and OH2.

Figure 7:
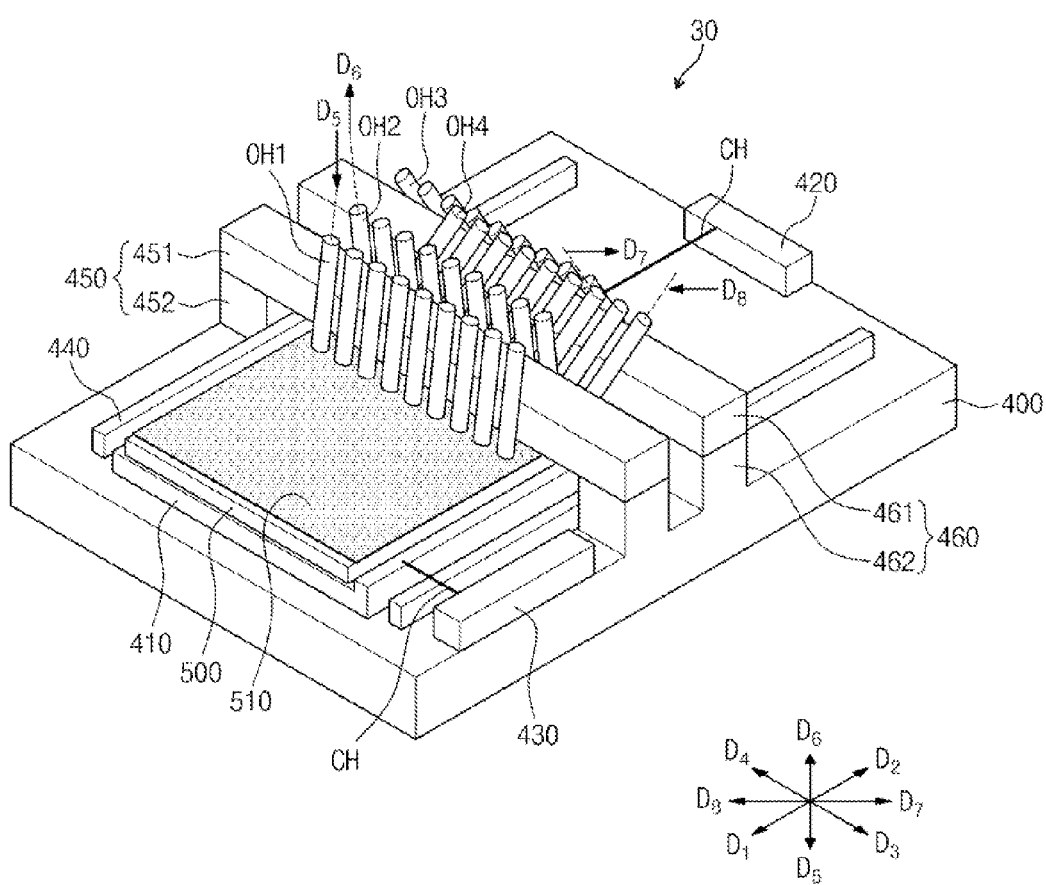
FIG. 7 is a perspective view showing an alignment apparatus according to an exemplary embodiment of the present invention.

FIG. 7 is a perspective view showing an alignment apparatus 30 according to an exemplary embodiment of the present invention.

Hereinafter, the alignment apparatus 30 will be described in detail. The same reference numbers will be assigned to the structure and components identical to those of FIGS. 2 and 6 ancy.

The alignment apparatus 30 further includes a plurality of third optical heads OH3, a plurality of fourth optical head OH4, and a second support part 460 fixing the third and fourth optical heads OH3 and OH4.

The second support part 460 includes a second horizontal support part 461 to which the third and fourth optical heads OH3 and OH4 are fixed and a second vertical support part 462 to support the second horizontal support 461 such that the second horizontal support part 461 is spaced apart from the stage 400 by a predetermined distance. The second support part 460 may include a connection device to supply a control signal from an external source to the third and fourth optical heads OH3 and OH4.

Each first optical head OH1 is inclined in a fifth direction D5 forming an angle of 45° with respect to the first direction Dl to supply a light in the fifth direction D5. In addition, each second optical head OH2 is inclined in a sixth direction D6 opposite to the fifth direction D5 to supply the light in the sixth direction D6.

Each third optical head OH3 is inclined in a seventh direction D7 forming an angle of 45° with respect to the second direction D2 to supply a light in the seventh direction D7. In addition, each fourth optical head OH4 is inclined in an eighth direction D8 opposite to the seventh direction D7 to supply the light in the eighth direction D8.

Inclination angles of the third and fourth optical heads OH3 and OH4 may be identical to or different from those of the first and second optical heads OH1 and OH2.

Since the alignment apparatus 30 includes the first to fourth optical heads OH1 to OH4 to supply the light L inclined in the fifth to eighth directions D5 and D8, the alignment apparatus 30 can align the alignment layer 510 in the fifth to eighth directions D5 and D8 when the substrate 500 passes through the first to fourth optical heads OH1 to OH4.

Figure 8:
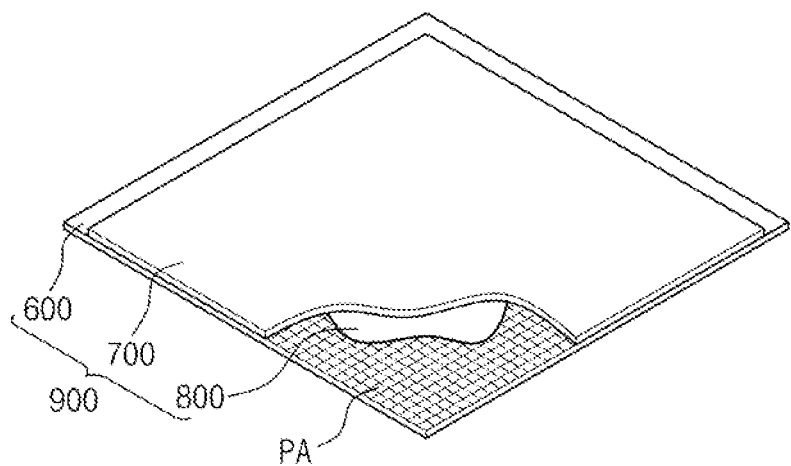
FIG. 8 is an exploded perspective view showing an LCD including the alignment layer aligned by the alignment apparatus according to an exemplary embodiment of the present invention.
Figure 9:
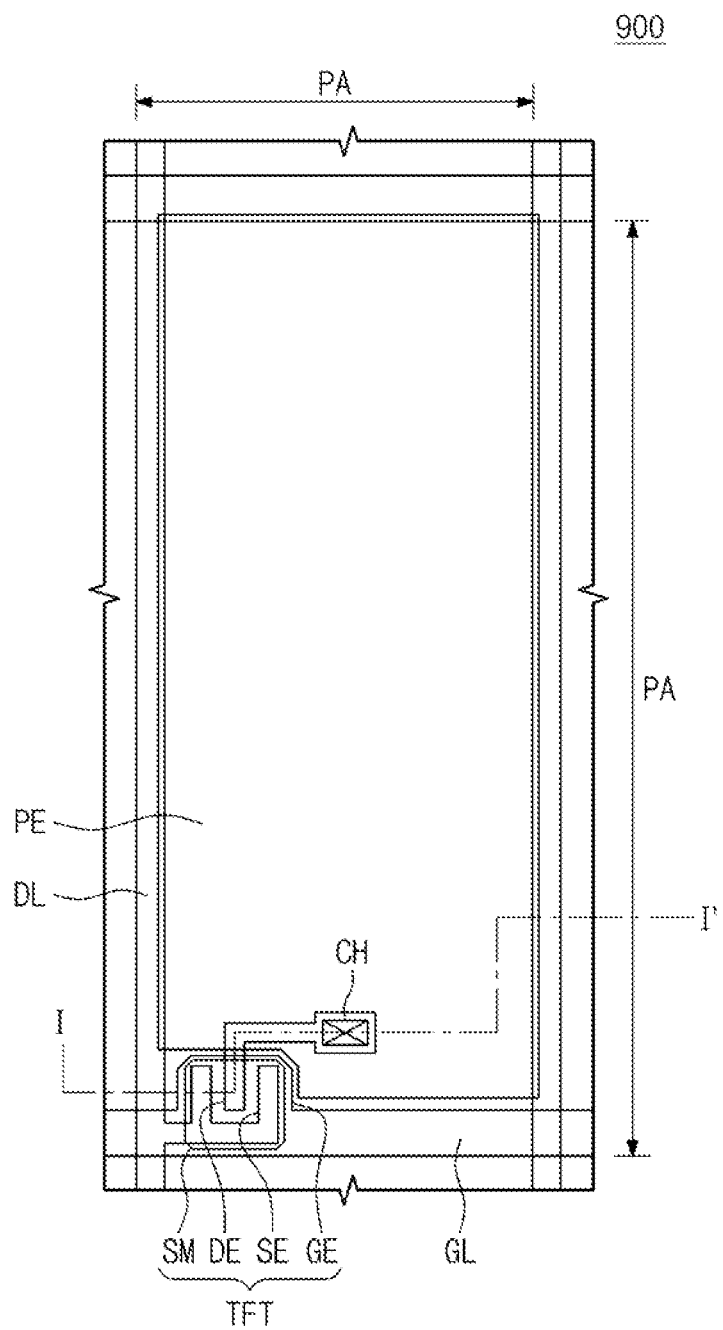
FIG. 9 is an enlarged plan view showing a part of the LCD shown in FIG. 8.
Figure 10:
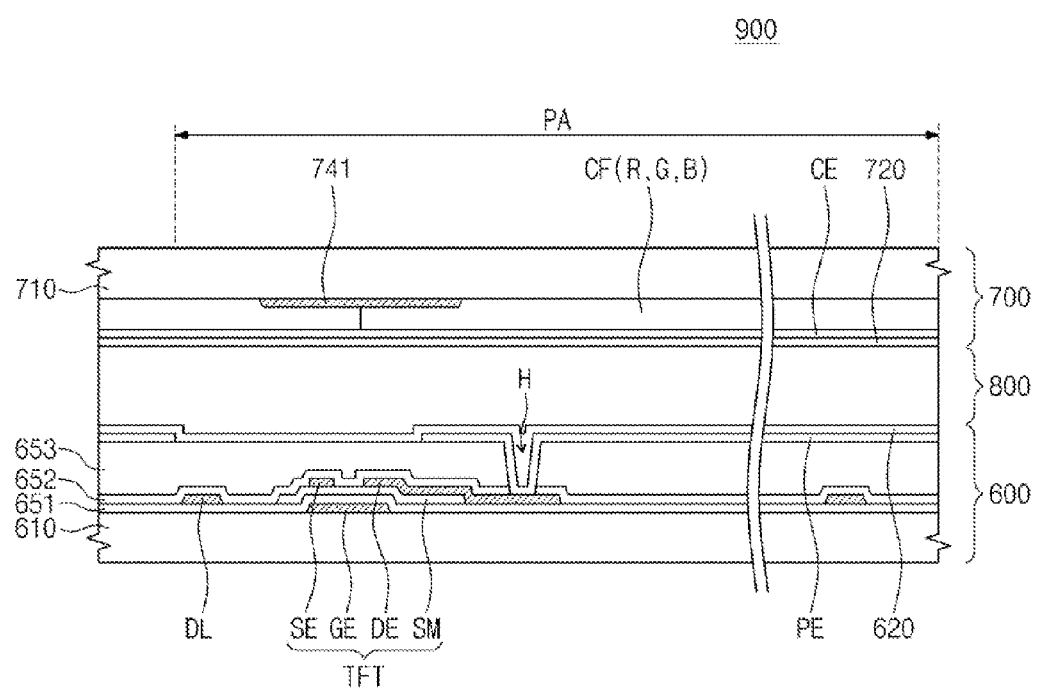
FIG. 10 is a sectional view taken along line I-I' of FIG. 9.

FIG. 8 is an exploded perspective view showing a liquid crystal display (LCD) 900 including the alignment layer aligned by the alignment apparatus according to an exemplary embodiment of the present invention. FIG. 9 is an enlarged plan view showing a part of the LCD shown in FIG. 8. FIG. 10 is a sectional view taken along line I-I' of FIG. 9.

Referring to FIGS. 8 to 10, the LCD 900 includes a first substrate 600, a second substrate 700, and a liquid crystal layer 800 interposed between the first substrate 600 and the second substrate 700.

The first substrate 600 includes a first base substrate 610, gate lines GL, data lines DL, thin film transistors TFT, pixel electrodes PE, and a first alignment layer 620.

The first base substrate 610 has a plurality of pixel regions PA. FIGS. 9 and 10 show only one pixel region PA for the purpose of explanation. Pixel regions PA are arranged in the foam of a matrix having a plurality of columns and rows.

Hereinafter, only one pixel region PA will be representatively described as the pixel regions PA have the same structure. In this case, the pixel region PA has a rectangular shape extending in one direction, but the present invention is not limited thereto. The pixel region PA may have various shapes, for example, a V shape or a Z shape.

The pixel region PA includes the gate line GL, the data line DL, the thin film transistor TFT, and the pixel electrode PE.

The gate line GL extends in one direction on the first base substrate 610.

The data line DL crosses the gate line GL in such a manner that the data line DL is insulated from the gate line GL on the first base substrate 610.

The thin film transistor TFT is adjacent to the intersection part of the gate line GL and the data line DL. The thin film transistor TFT includes a gate electrode GE branching from the gate line GL, a source electrode SE branching from the data line DL, and a drain electrode DE spaced apart from the source electrode SE.

The pixel electrode PE is connected to the drain electrode DE.

Referring to FIG. 10, the pixel region PA on the first base substrate 610 includes the gate line GL and the gate electrode GE.

A semiconductor pattern SM is provided on the gate line GL while interposing a first insulating layer 651 between the semiconductor pattern SM and the gate line GL. The base substrate 610 having the semiconductor pattern SM is provided thereon with the data line DL, the source electrode SE, and the drain electrode DE. In this case, the semiconductor pattern SM includes a conductive channel between the source electrode SE and the drain electrode DE.

The first insulating layer 651 having the source electrode SE and the drain electrode DE is provided thereon with a second insulating layer 652. The second insulating layer 652 is provided thereon with an organic layer 653. The organic layer 653 is provided thereon with the pixel electrode PE, and the pixel electrode PE is electrically connected to the drain electrode DE through a contact hole H formed through the second insulating layer 652 and the organic layer 653.

The first alignment layer 620 is provided on the pixel electrode PE to cover the pixel electrode PE.

The second substrate 700 is provided in opposition to the first substrate 600. The second substrate 700 includes a second base substrate 710, color filters CF, a black matrix 741, a common electrode CE, and a second alignment layer 720.

The color filters CF and the black matrix 741 are provided on the second base substrate 710. The common electrode CE and the second alignment layer 720 are sequentially formed on the color filter CF and the black matrix 741.

The color filters CF are provided corresponding to the pixel regions PA. Each color filter CF represents one of red, green, and blue colors. The black matrix 741 is interposed between the color filters CF to block a light passing through the liquid crystal layer 800 between the color filters CF. The common electrode CE is provided on the color filters CF and the black matrix 741. The second alignment layer 720 covers the common electrode CE.

After the first alignment layer 620 and/or the second alignment layer 720 are/is exposed to a light and aligned, the first and second substrates 600 and 700 are bonded with each other while interposing the liquid crystal layer 800 therebetween. The liquid crystal layer 800 is interposed between the first and second alignment layers 620 and 720. The liquid crystal layer 800 includes liquid crystal vertically aligned. For example, when a vertical electric field is formed between the pixel electrode PE and the common electrode CE, the liquid crystal may include a negative dielectric anisotropy liquid crystal so that the vertically-aligned liquid crystal can rotate in a horizontal direction. However, according to an exemplary embodiment, the liquid crystal layer 800 may include a twisted nematic liquid crystal.

When the thin film transistor TFT is turned on in response to the driving signal supplied through the gate line GL, an image signal supplied through the data line DL is supplied to the pixel electrode PE through the thin film transistor TFT. Accordingly, an electric field is formed between the pixel electrode PE and the common electrode CE to which a common voltage is applied. The liquid crystal molecules of the liquid crystal layer 800 are driven according to the electric field, and an image is displayed according to an amount of a light passing through the liquid crystal layer 800.

The pre-tilt angle of the liquid crystal molecules of the liquid crystal layer 800 varies according to the characteristics of the first alignment layer 620 and the second alignment layer 720. When the liquid crystal layer 800 includes vertically-aligned liquid crystal, the vertically-aligned liquid crystal may have a pre-tilt angle of about 85° to about 90° with respect to the surface of the first alignment layer 620 or the second alignment layer 720.

The first and second alignment layers 620 and 720 are aligned by the alignment apparatus without a mask according to exemplary embodiments of the present invention. The alignment direction of the first and second alignment layers 620 and 720 will be described in detail with reference to accompanying drawings below.

Figure 11:
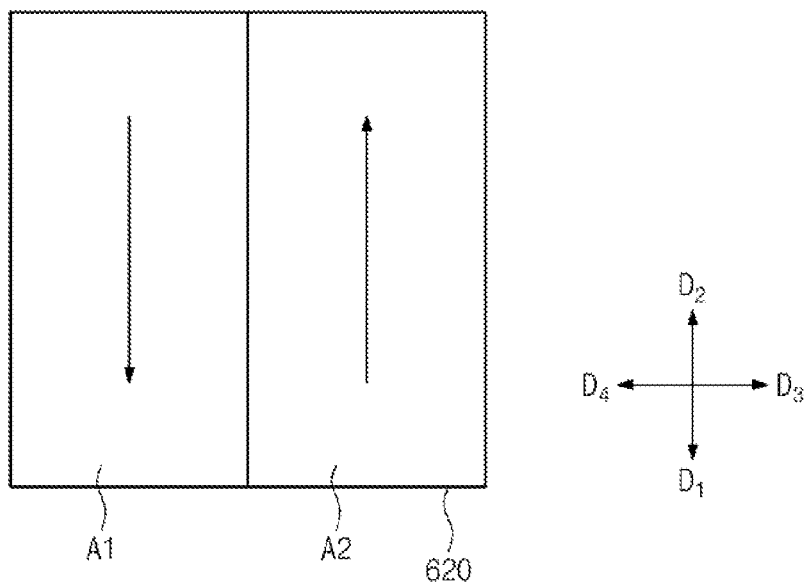
FIG. 11 is a view showing a method of aligning the alignment layer of FIG. 10 according to an exemplary embodiment of the present invention.

FIG. 11 is a view showing a method of aligning the alignment layer of FIG. 10 according to an exemplary embodiment of the present invention. In order to align the liquid crystal of the liquid crystal layer 800, one of the first and second alignment layers 620 and 720 may be exposed to a light and aligned, or both of the first and second alignment layers 620 and 720 may be exposed to a light and aligned. FIGS. 11 to 17 are views showing a method of exposing one of the first and second alignment layers 620 and 720 to a light and aligning only one of the first and second alignment layers 620 and 720. FIGS. 18A to 20C are views showing a method of exposing both of the first and second alignment layers 620 and 720 to alight and aligning both of the first and second alignment layers 620 and 720. In addition, for the purpose explanation, FIGS. 11 to 20C show only an alignment region corresponding to one pixel.

Although the alignment of the first alignment layer 620 is shown in FIGS. 11 to 17 for an example, the second alignment layer 720 may be aligned. In FIGS. 11 to 17, the alignment direction of the first alignment layer 620 is parallel to the alignment direction of the liquid crystal of the liquid crystal layer 800.

FIG. 11 shows that the first alignment layer 620 corresponding to one pixel is divided into a first region A1 and a second region A2, the first region A1 is aligned in the first direction D1, and the second region A2 is aligned in the second direction D2 opposite to the first direction D1.

When the alignment layer 620 is aligned by using the alignment apparatus 10 of FIG. 2 as shown in FIG. 11, the alignment apparatus 10 allows the first alignment layer 620 to pass through the first optical heads OH1 to align the first region A1. Thereafter, the alignment apparatus 10 rotates the first alignment layer 620 by an angle of 180° to align the second region A2, which is not aligned, while allowing the first alignment layer 620 to pass through the first optical heads OH1.

When the first alignment layer 620 is aligned by using the alignment apparatus 20 of FIG. 6 as shown in FIG. 11, the alignment apparatus 20 allows the first alignment layer 620 to pass through the first and second optical heads OH1 and OH2 to simultaneously align the first and second regions A1 and A2. For example, when the first alignment layer 620 is aligned by using the alignment apparatus 20 of FIG. 6, the first alignment layer 620 passes through the first and second optical heads OH1 and OH2, so that the first optical head OH1 aligns the first region A1 and the second optical head OH2 aligns the second region A2.

Figure 12:
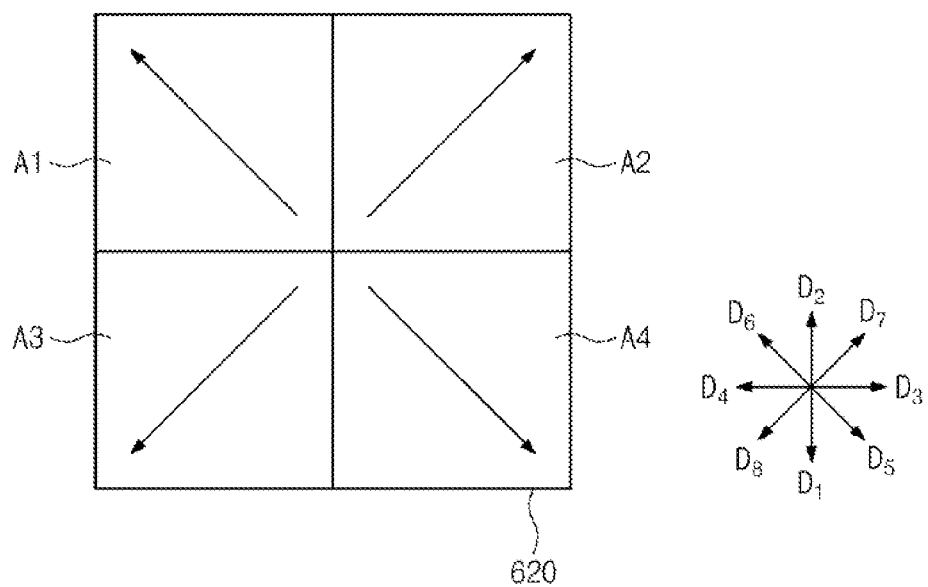
FIG. 12 is a view showing a method of aligning the alignment layer of FIG. 10 according to an exemplary embodiment of the present invention.

FIG. 12 is a view showing a method of aligning the alignment layer of FIG. 10 according to an exemplary embodiment of the present invention.

FIG. 12 shows that the first alignment layer 620 corresponding to one pixel is divided into first, second, third, and fourth regions A1, A2, A3, and A4. The first, second, third, and fourth regions A1, A2, A3, and A4 are aligned in the sixth direction D6, the seventh direction D7, the eighth direction D8, and fifth direction D5, respectively.

When the first alignment layer 620 is aligned by using the alignment apparatus 10 of FIG. 2 as shown in FIG. 12, the alignment apparatus 10 allows the first alignment layer 620 to pass through the first optical heads OH1 to align the third and fourth regions A3 and A4 in the first direction D1. Then, the alignment apparatus 10 rotates the first alignment layer 620 at an angle of 90° clockwise to align the second and fourth regions A2 and A4 in the third direction D3 while allowing the first alignment layer 620 to pass through the first optical heads OH1. Next, the alignment apparatus 10 rotates the first alignment layer 620 at an angle of 90° clockwise to align the first and second regions A1 and A2 in the second direction D2 while allowing the first alignment layer 620 to pass through the first optical heads OH1. Finally, the alignment apparatus 10 rotates the first alignment layer 620 at an angle of 90° clockwise to align the first and third regions A1 and A3 in the fourth direction D4 while allowing the first alignment layer 620 to pass through the first optical heads OH1. Accordingly, when the alignment apparatus 10 of FIG. 2 is used, the first alignment layer 620 can be aligned as shown in FIG. 12 by passing through the first optical heads OH1 four times.

When the first alignment layer 620 is aligned by the alignment apparatus 20 of FIG. 6 as described above, the first optical heads OH1 align the third and fourth regions A3 and A4 in the first direction D1, and the second optical heads OH2 align the first and second regions A1 and A2 in the second direction D2 as the first alignment layer 620 passes through the first and second optical heads OH1 and OH2.

Thereafter, the substrate 500 is rotated by an angle of 90° clockwise. Then, while the substrate 500 is passing through the first and second optical heads OH1 and OH2, the first optical heads OH1 align the second and fourth regions A2 and A4 in the third direction D3, and the second optical heads OH2 align the first and third regions A1 and A3 in the fourth direction D4. Accordingly, when the alignment apparatus 20 of FIG. 6 is used, the alignment apparatus 20 allows the first alignment layer 620 to pass through the first and second optical heads OH1 and OH2 twice to align the first alignment layer 620 as shown in FIG. 12.

When the first alignment layer 620 is aligned by the alignment apparatus 30 of FIG. 7 as shown in FIG. 12, the first to fourth optical heads OH1 to OH4 align the fourth region A4, the first region A1, the second region A2, and the third region A3 in the fifth direction D5, the sixth direction D6, the seventh direction D7, and the eighth direction D8, respectively, as the first alignment layer 620 passes through the first and fourth optical heads OH1 to OH4. Therefore, when the alignment apparatus 30 of FIG. 7 is used, the first alignment layer 620 passes through the first to fourth optical heads OH1 to OH4 one time, so that the first alignment layer 620 can be aligned as shown in FIG. 12.

Figure 13:
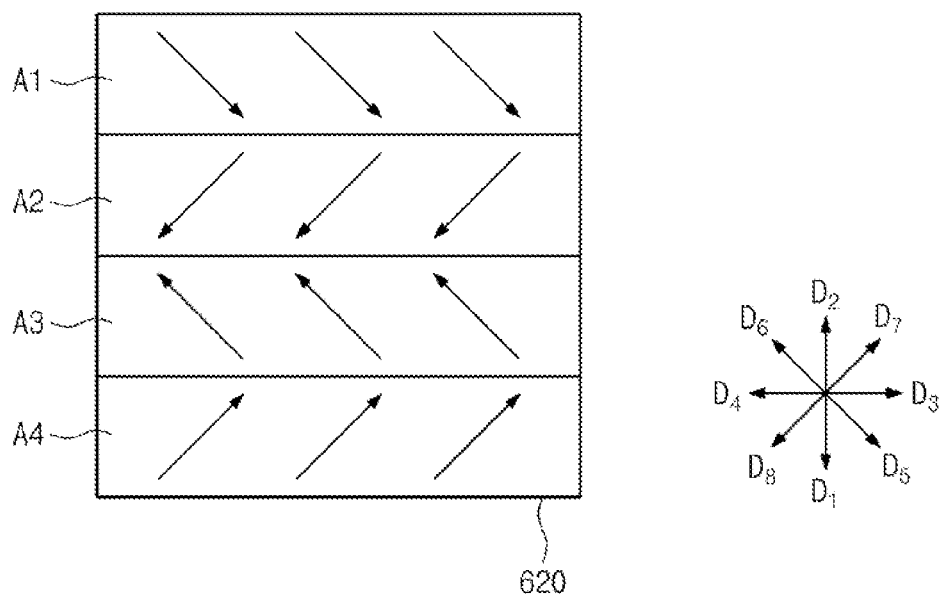
FIG. 13 is a view showing a method of aligning the alignment layer of FIG. 10 according to an exemplary embodiment of the present invention.
Figure 13:
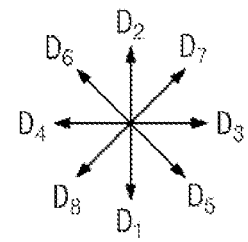

FIG. 13 is a view showing a method of aligning the alignment layer of FIG. 10 according to an exemplary embodiment of the present invention.

FIG. 13 shows that the first alignment layer 620 corresponding to one pixel is divided into first to fourth regions A1 to A4 extending in a transverse direction, and the first to fourth regions A1 to A4 are aligned in the fifth direction D5, the eighth direction D8, the sixth direction D6, and the seventh direction D7, respectively.

When the first alignment layer 620 is aligned by using the alignment apparatus 10 of FIG. 2 as shown in FIG. 13, the alignment apparatus 10 allows the first alignment layer 620 to pass through the first optical heads OH1 so that the first and second regions A1 and A2 are aligned in the first direction D1. Thereafter, the alignment apparatus 620 rotates the first alignment layer 620 at an angle of 90° clockwise to align the first and fourth regions A1 and A4 in the third direction D3 while allowing the first alignment layer 620 to pass through the first optical heads OH1. Subsequently, the alignment apparatus 620 rotates the first alignment layer 620 at an angle of 90° clockwise to align the third and fourth regions A3 and A4 in the second direction D2 while allowing the first alignment layer 620 to pass through the first optical heads OH 1. Finally, the alignment apparatus 620 rotates the first alignment layer 620 at an angle of 90° clockwise to align the second and third regions A2 and A3 in the fourth direction D4 while allowing the first alignment layer 620 to pass through the first optical heads OH1. Accordingly, when the alignment apparatus 10 of FIG. 2 is used, the first alignment layer 620 passes through the first optical heads OH1 four times so that the first alignment layer 620 can be aligned as shown in FIG. 13.

When the first alignment layer 620 is aligned by using the alignment apparatus 20 of FIG. 6 as shown in FIG. 13, the first optical heads OH1 align the first and second regions A1 and A2 in the first direction D1, and the second optical heads OH2 align the third and fourth regions A3 and A4 in the second direction D2 as the first alignment layer 620 passes through the first and second optical heads OH1 and OH2.

Thereafter, the first alignment layer 620 is rotated by an angle of 90° clockwise. Then, while the first alignment layer 620 is passing through the first and second optical heads OH1 and OH2, the first optical heads OH1 align the first and fourth regions A1 and A4 in the third direction D3, and the second optical heads OH2 align the second and third regions A2 and A3 in the fourth direction D4. Accordingly, when the alignment apparatus 20 of FIG. 6 is used, the alignment apparatus 20 allows the first alignment layer 620 to pass through the first and second optical heads OH1 and OH2 twice to align the first alignment layer 620 as shown in FIG. 13.

When the first alignment layer 620 is aligned by using the alignment apparatus 30 of FIG. 7 as shown in FIG. 13, the first to fourth optical heads OH1 to OH4 align the first region A1, the third region A3, the fourth region A4, and the second region A2 in the fifth direction D5, the sixth direction D6, the seventh direction D7, and the eighth direction D8, respectively, as the first alignment layer 620 passes through the first and fourth optical heads OH1 to OH4. Therefore, when the alignment apparatus 30 of FIG. 7 is used, the first alignment layer 620 passes through the first to fourth optical heads OH1 to OH4 one time, so that the first alignment layer 620 can be aligned as shown in FIG. 13.

Figure 14:
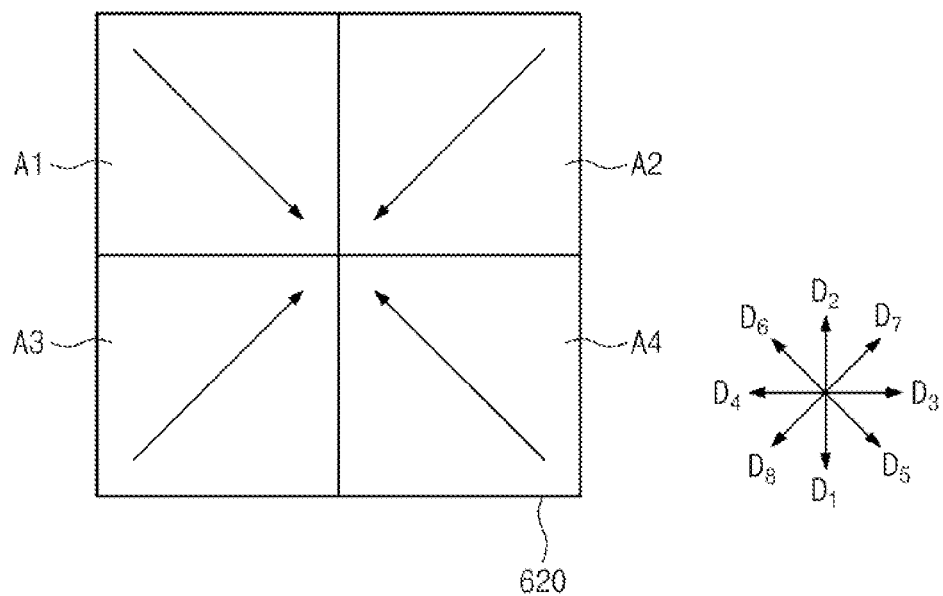
FIG. 14 is a view showing a method of aligning the alignment layer of FIG. 10 according to an exemplary embodiment of the present invention.
Figure 14:
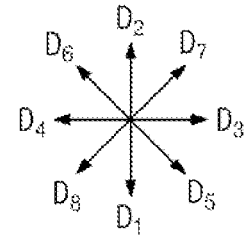

FIG. 14 is a view showing a method of aligning the alignment layer of FIG. 10 according to an exemplary embodiment of the present invention.

FIG. 14 shows that the first alignment layer 620 corresponding to one pixel is divided into first to fourth regions A1 to A4, and the first to fourth regions A1 to A4 are aligned in the fifth direction D5, the eighth direction D8, the seventh direction D7 and the sixth direction D6, respectively.

When the first alignment layer 620 is aligned by using the alignment apparatus 10 of FIG. 2 as shown in FIG. 14, the alignment apparatus 10 allows the first alignment layer 620 to pass through the first optical heads OH1 so that the first and second regions A1 and A2 are aligned in the first direction D1. Thereafter, the alignment apparatus 620 rotates the first alignment layer 620 at an angle of 90° clockwise to align the first and third regions A1 and A3 in the third direction D3 while allowing the first alignment layer 620 to pass through the first optical heads OH1. Subsequently, the alignment apparatus 620 rotates the first alignment layer 620 at an angle of 90° clockwise to align the third and fourth regions A3 and A4 in the second direction D2 while allowing the first alignment layer 620 to pass through the first optical heads OH1. Finally, the alignment apparatus 620 rotates the first alignment layer 620 at an angle of 90° clockwise to align the second and fourth regions A2 and A4 in the fourth direction D4 while allowing the first alignment layer 620 to pass through the first optical heads OH1. Accordingly, when the alignment apparatus 10 of FIG. 2 is used, the first alignment layer 620 passes through the first optical heads OH1 four times so that the first alignment layer 620 can be aligned as shown in FIG. 14.

When the first alignment layer 620 is aligned by using the alignment apparatus 20 of FIG. 6 as shown in FIG. 14, the first optical heads OH1 align the first and second regions A1 and A2 in the first direction D1, and the second optical heads OH2 align the third and fourth regions A3 and A4 in the second direction D2, as the first alignment layer 620 passes through the first and second optical heads OH1 and OH2.

Thereafter, the first alignment layer 620 is rotated by an angle of 90° clockwise. Then, while the first alignment layer 620 is passing through the first and second optical heads OH1 and OH2, the first optical heads OH1 align the first and third regions A1 and A3 in the third direction D3, and the second optical heads OH2 align the second and fourth regions A2 and A4 in the fourth direction D4. Accordingly, when the alignment apparatus 20 of FIG. 6 is used, the alignment apparatus 20 allows the first alignment layer 620 to pass through the first and second optical heads OH1 and OH2 twice to align the first alignment layer 620 as shown in FIG. 14.

When the first alignment layer 620 is aligned by using the alignment apparatus 30 of FIG. 7 as shown in FIG. 14, the first to fourth optical heads OH1 to OH4 align the first region A1, the fourth region A4, the second region A2, and the third region A3 in the fifth direction D5, the sixth direction D6, the seventh direction D7, and the eighth direction D8, respectively, as the first alignment layer 620 passes through the first to fourth optical heads OH1 to OH4. Therefore, when the alignment apparatus 30 of FIG. 7 is used, the first alignment layer 620 passes through the first to fourth optical heads OH1 to OH4 one time, so that the first alignment layer 620 can be aligned as shown in FIG. 14.

Figure 15:
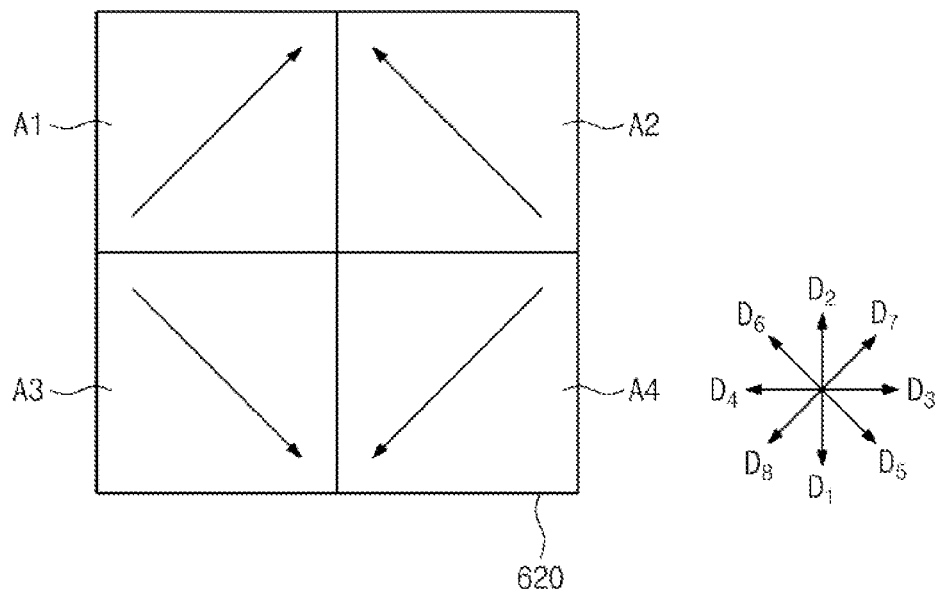
FIG. 15 is a view showing a method of aligning the alignment layer of FIG. 10 according to an exemplary embodiment of the present invention.

FIG. 15 is a view showing a method of aligning the alignment layer of FIG. 10 according to an exemplary embodiment of the present invention. FIG. 15 shows that the first alignment layer 620 corresponding to one pixel is divided into the first to fourth regions A1 to A4, and the first to fourth regions A1 to A4 are aligned in the seventh direction D7, the sixth direction D6, the fifth direction D5, and the eighth direction D8.

The method of aligning the first alignment layer 620 as shown in FIG. 15 may be performed using the alignment apparatus 10, 20, and 30 shown in FIGS. 2, 6, and 7, in a manner similar to that discussed above with reference to FIGS. 11 to 14.

Figure 16:
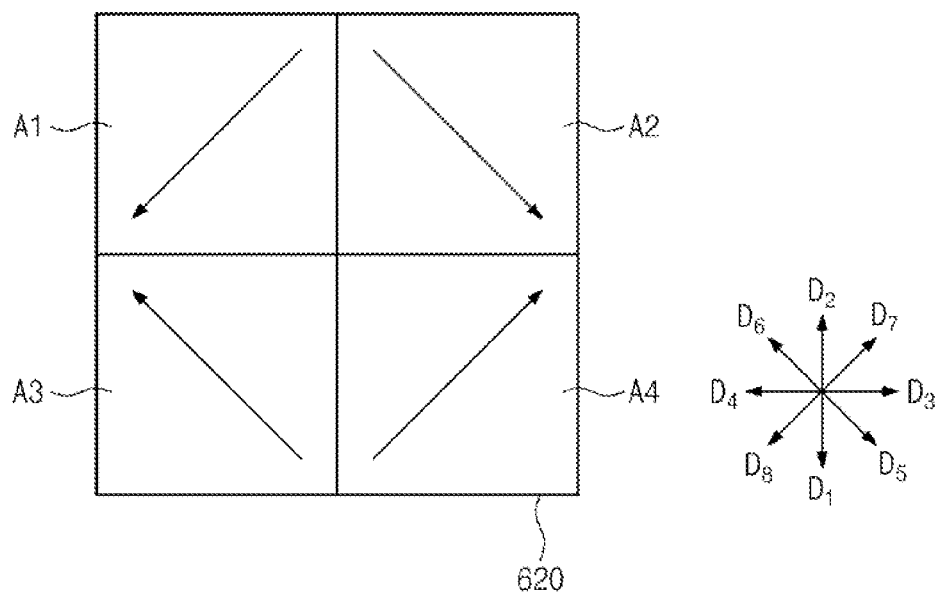
FIG. 16 is a view showing a method of aligning the alignment layer of FIG. 10 according to an exemplary embodiment of the present invention.

FIG. 16 is a view showing a method of aligning the alignment layer of FIG. 10 according to an exemplary embodiment of the present invention. FIG. 16 shows that the first alignment layer 620 corresponding to one pixel is divided into the first to fourth regions A1 to A4, and the first to fourth regions A1 to A4 are aligned in the eighth direction D8, the fifth direction D5, the sixth direction D6, and the seventh direction D7.

The method of aligning the first alignment layer 620 as shown in FIG. 16 may be performed using the alignment apparatus 10, 20, and 30 shown in FIGS. 2, 6, and 7, in a manner similar to that discussed above with reference to FIGS. 11 to 14.

Figure 17:
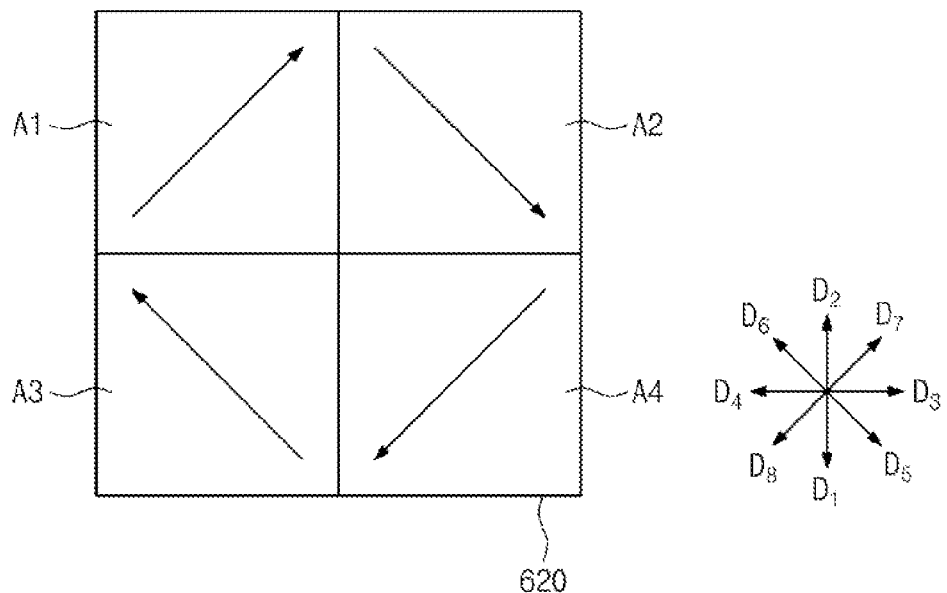
FIG. 17 is a view showing a method of aligning the alignment layer of FIG. 10 according to an exemplary embodiment of the present invention.

FIG. 17 is a view showing a method of aligning the alignment layer of FIG. 10 according to an exemplary embodiment of the present invention. FIG. 17 shows that the first alignment layer 620 corresponding to one pixel is divided into the first to fourth regions A1 to A4, and the first to fourth regions A1 to A4 are aligned in the seventh direction D7, the fifth direction D5, the sixth direction D6, and the seventh direction D8.

The method of aligning the first alignment layer 620 as shown in FIG. 17 may be performed using the alignment apparatus 10, 20, and 30 shown in FIGS. 2, 6, and 7, in a manner similar to that discussed above with reference to FIGS. 11 to 14.

Figure 18A:
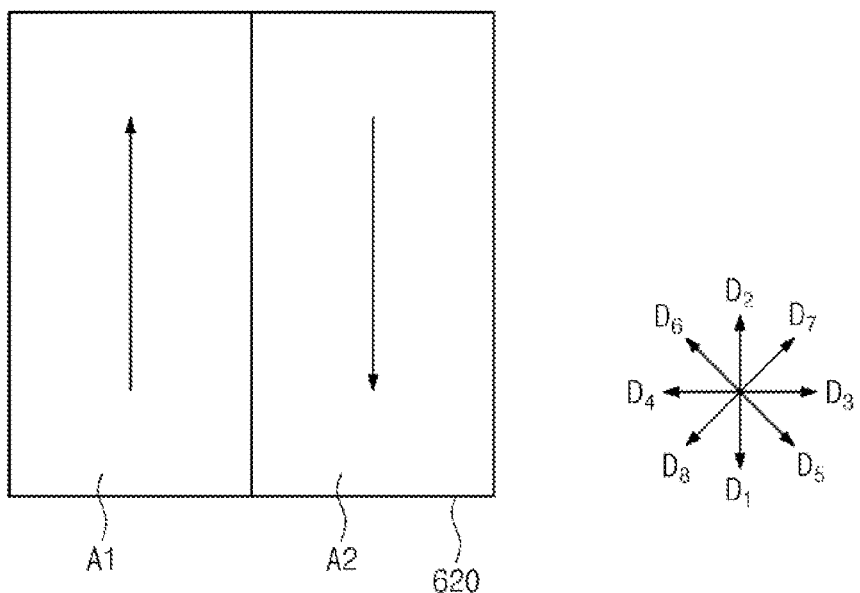
FIGS. 18A to 18C are views showing a method of aligning the alignment layer of FIG. 10 according to an exemplary embodiment of the present invention.
Figure 18B:
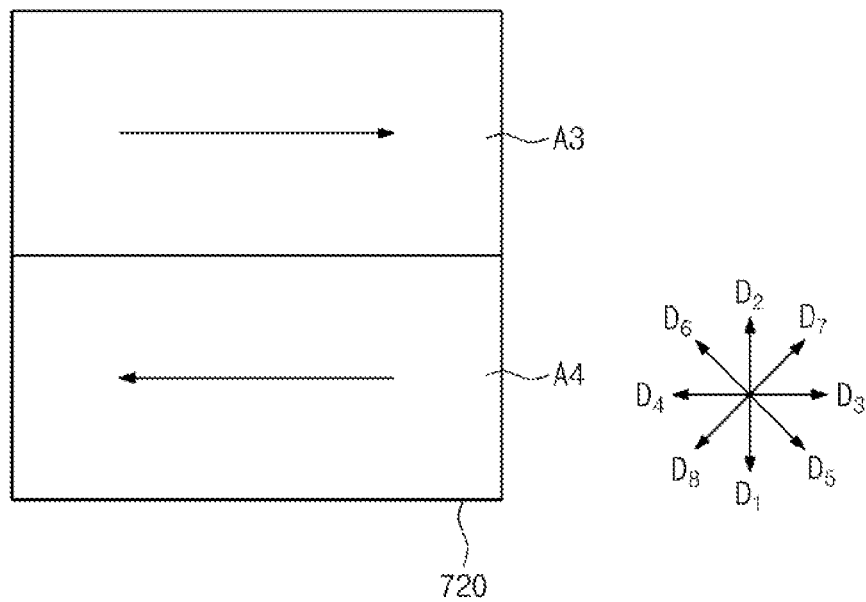
Figure 18C:
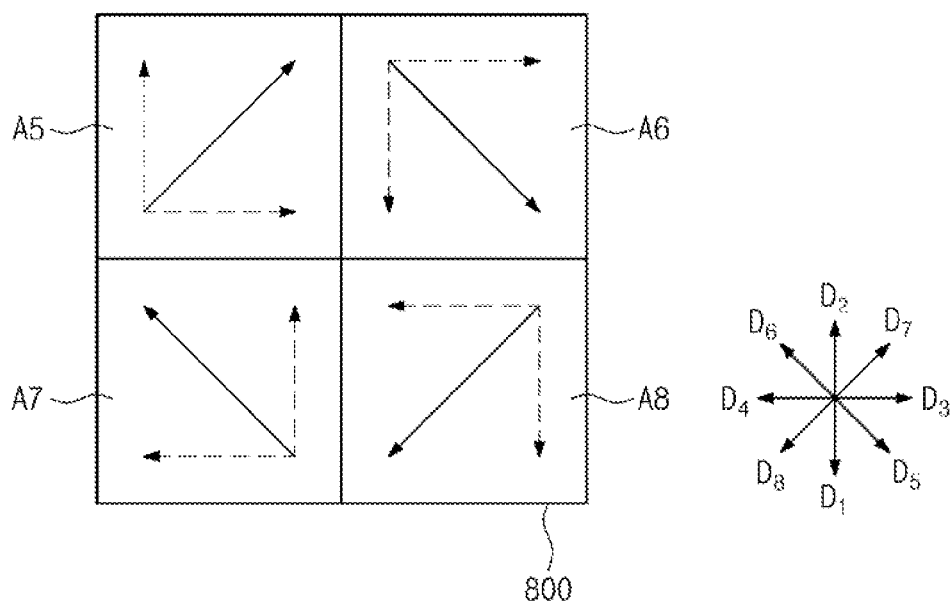

FIGS. 18A to 18C are views showing a method of aligning the alignment layer of FIG. 10 according to an exemplary embodiment of the present invention. In detail, FIG. 18A is a view showing a direction of exposing the first alignment layer 620 to a light and aligning the first alignment layer 620, and FIG. 18B is a view showing a direction of exposing the second alignment layer 720 to a light and aligning the second alignment layer 720. FIG. 18C is a view showing the alignment direction of the liquid crystal of the liquid crystal layer 800 by the first and second alignment layers 620 and 720. The first and second alignment layers 620 and 720 can be aligned by using the alignment apparatuses 10, 20, and 30 of FIGS. 2, 6, and 7 through the method described with reference to FIGS. 11 to 17.

Referring to FIG. 18A, the first alignment layer 620 is divided into the first and second regions A1 and A2, the first region A1 is aligned in the second direction D2, and the second region A2 is aligned in the first direction D1.

Referring to FIG. 18B, the second alignment layer 720 is divided into the third and fourth regions A3 and A4, the third region A3 is aligned in the third direction D3, and the fourth region A4 is aligned in the fourth direction A4.

Referring to FIG. 18C, the liquid crystal of the liquid crystal layer 800 belonging to a fifth region A5 overlapping with the first and third regions A1 and A3 is aligned in the seventh direction D7 which is a vector sum of the alignment directions of the first and second regions A1 and A3. Similarly, the liquid crystal of the liquid crystal layer 800 belonging to a sixth region A6 overlapping with the second and third regions A2 and A3 is aligned in the fifth direction D5 which is a vector sum of the alignment directions of the second and third regions A2 and A3. The liquid crystal of the liquid crystal layer 800 belonging to a seventh region A7 overlapping with the first and fourth regions A1 and A4 is aligned in the sixth direction D6, and the liquid crystal of the liquid crystal layer 800 belonging to an eighth region A8 overlapping with the second and fourth regions A2 and A4 is aligned in the eighth direction D8.

Figure 19A:
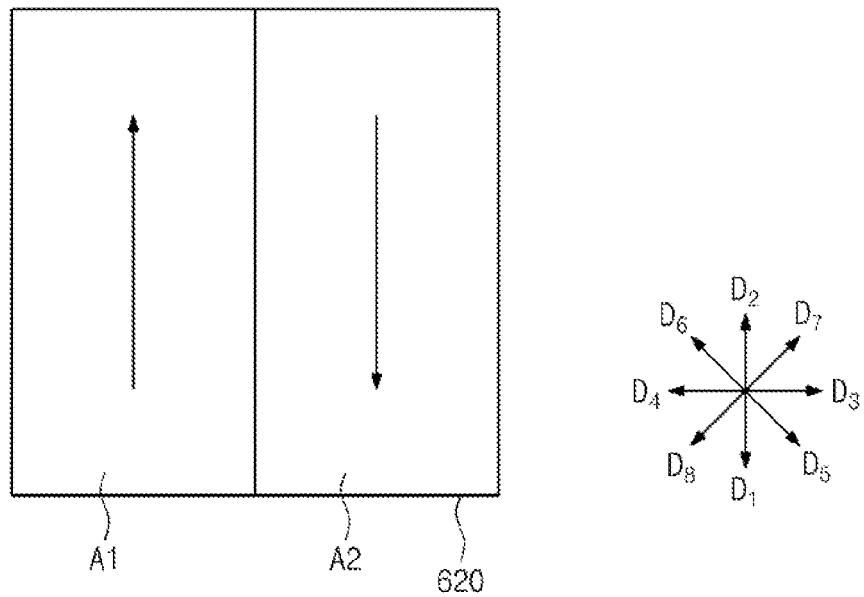
FIGS. 19A to 19C are views showing a method of aligning the alignment layer of FIG. 10 according to an exemplary embodiment of the present invention.
Figure 19B:
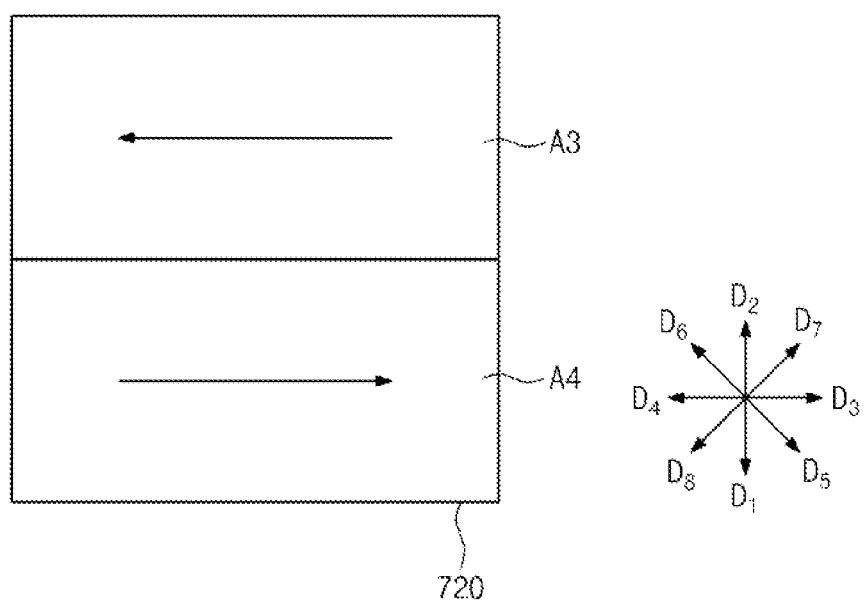
Figure 19C:
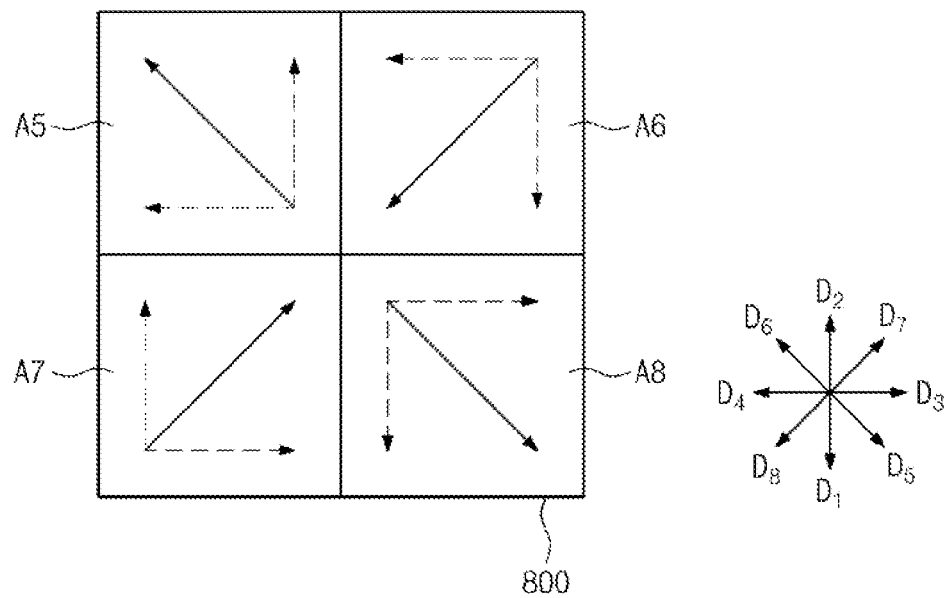

FIGS. 19A to 19C are views showing a method of aligning the alignment layer of FIG. 10 according to an exemplary embodiment of the present invention. FIG. 19A is a view showing a direction of exposing the first alignment layer 620 to a light and aligning the first alignment layer 620. FIG. 19B is a view showing a direction of exposing and aligning the second alignment layer 720. FIG. 19C is a view showing the alignment direction of the liquid crystal of the liquid crystal layer 800 by the first and second alignment layers 620 and 720.

Referring to FIG. 19A, the first alignment layer 620 is divided into the first and second regions A1 and A2. The first region A1 is aligned in the second direction D2, and the second region A2 is aligned in the first direction D1.

Referring to FIG. 19B, the second alignment layer 720 is divided into the third region A3 and the fourth region A4. The third region A3 is aligned in the fourth direction D4, and the fourth region A4 is aligned in the third direction D3.

Referring to FIG. 19C, the liquid crystal of the liquid crystal layer 800 belonging to the fifth region A5 overlapping with the first and third regions A1 and A3 is aligned in the sixth direction D6 which is a vector sum of the alignment directions of the first and second regions A1 and A3. Similarly, the liquid crystal of the liquid crystal layer 800 belonging to the sixth region A6 overlapping with the second and third regions A2 and A3 is aligned in the eighth direction D8 which is a vector sum of the alignment directions of the second and third regions A2 and A3. The liquid crystal of the liquid crystal layer 800 belonging to the seventh region A7 overlapping with the first and fourth regions A1 and A4 is aligned in the seventh direction D7, and the liquid crystal of the liquid crystal layer 800 belonging to the eighth region A8 overlapping with the second and fourth regions A2 and A4 is aligned in the fifth direction D5.

Figure 20A:
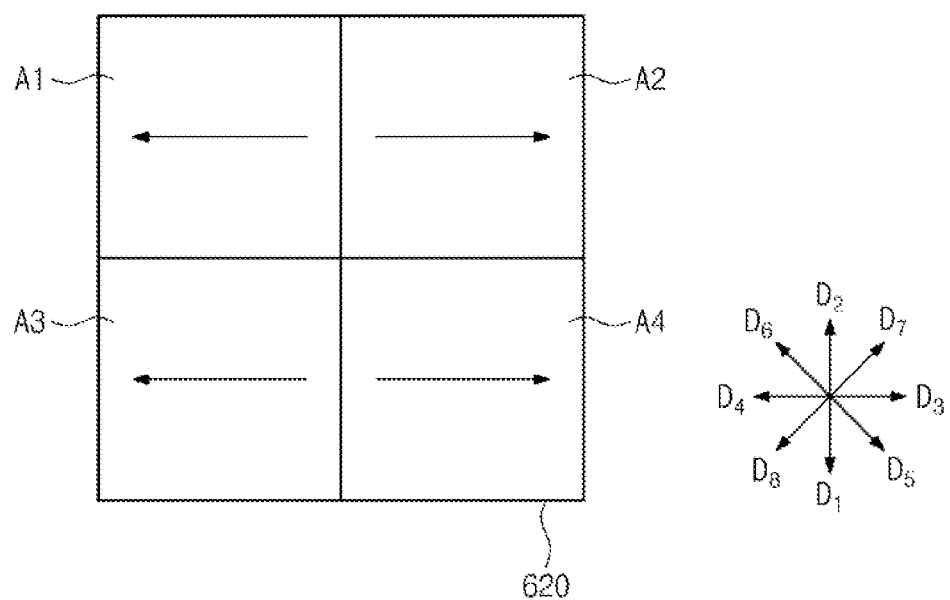
FIGS. 20A to 20C are views showing a method of aligning the alignment layer of FIG. 10 according to an exemplary embodiment of the present invention.
Figure 20B:
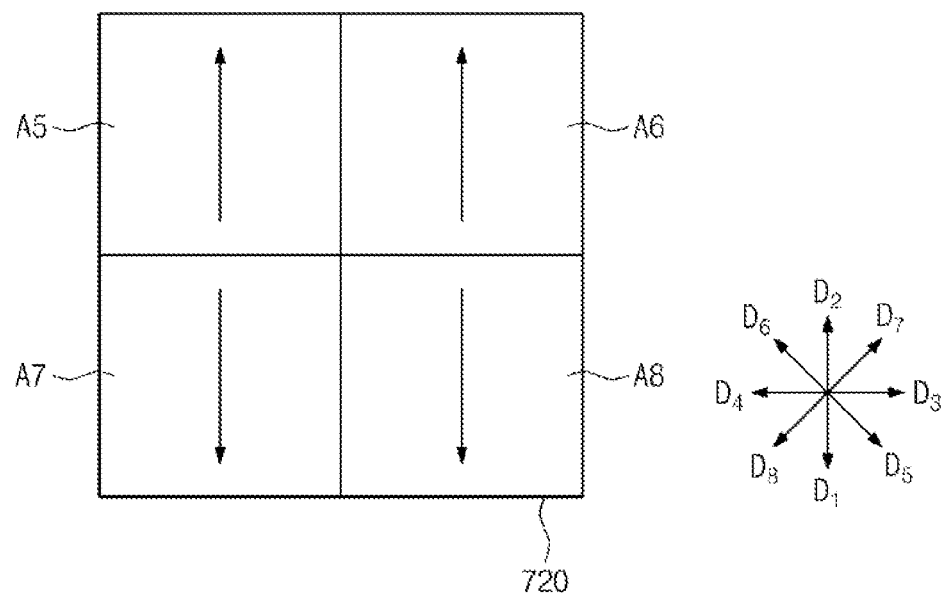
Figure 20C:
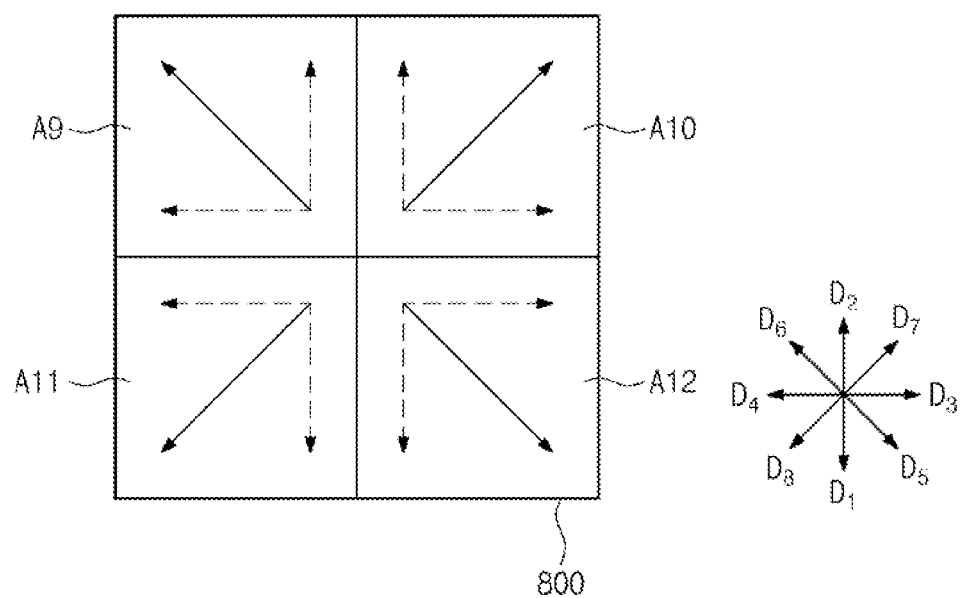

FIGS. 20A to 20C are views showing a method of aligning the alignment layer of FIG. 10 according to an exemplary embodiment of the present invention. FIG. 20A is a view showing a direction of exposing the first alignment layer 620 to a light and aligning the first alignment layer 620. FIG. 20B is a view showing a direction of exposing the second alignment layer 720 to a light and aligning the second alignment layer 720. FIG. 20C is a view showing the alignment direction of the liquid crystal of the liquid crystal layer 800 by the first and second alignment layers 620 and 720.

Referring to FIG. 20A, the first alignment layer 620 is divided into the first region A1, the second region A2, the third region A3, and the fourth region A4. The first and third regions A1 and A3 are aligned in the fourth direction D4, and the second and fourth regions A2 and A4 are aligned in the third direction D3.

Referring to FIG. 20B, the second alignment layer 720 is divided into the fifth, sixth, seventh, and eighth regions A5, A6, A7, and A8. The fifth and sixth regions A5 and A6 are aligned in the second direction D2, and the seventh and eighth regions A7 and A8 are aligned in the first direction D1.

Referring to FIG. 20C, the liquid crystal of the liquid crystal layer 800 belonging to a ninth region A9 overlapping with the first and fifth regions A1 and A5 is aligned in the sixth direction D6 which is a vector sum of the alignment directions of the first and fifth regions A1 and A5. Similarly, the liquid crystal of the liquid crystal layer 800 belonging to a tenth region A10 overlapping with the second and third regions A2 and A6 is aligned in the seventh direction D7 which is a vector sum of the alignment directions of the second and third regions A2 and A6. The liquid crystal of the liquid crystal layer 800 belonging to the an eleventh region A11 overlapping with the third and fourth regions A3 and A7 is aligned in the eighth direction D8, and the liquid crystal of the liquid crystal layer 800 belonging to a twelfth region A12 overlapping with the second and fourth regions A4 and A8 is aligned in the fifth direction D5.

Although exemplary embodiments of the present invention have been described, it is understood that the present invention should not be limited to these exemplary embodiments but various changes and modifications can be made.

What is claimed is:

1. An apparatus of aligning an alignment layer of a panel, the apparatus comprising:
a light source generating a light;
a stage receiving a substrate having the alignment layer provided thereon, the alignment layer comprising a plurality of alignment regions;
a data processor loading data identifying positions of the alignment regions relative to the alignment layer and generating a control signal for controlling the light based on the loaded data identifying the positions of the alignment regions;
a plurality of first optical heads, each of which is inclined in a first direction, receiving the control signal, controlling the light and selectively supplying the light to a first set of the alignment regions of the alignment layer at a first angle of incidence, and
a plurality of second optical heads, each of which is inclined in a second direction different from the first direction, receiving the control signal, controlling the light and selectively supplying the light to a second set of the alignment regions of the alignment layer at a second angle of incidence different from the first angle of incidence.

2. The apparatus of claim 1, wherein the pluralities of first and second optical heads are configured to supply the light at an incline with respect to a line normal to a top surface of the alignment layer.

3. The apparatus of claim 2, wherein the first direction is an opposite direction from the second direction.

4. The apparatus of claim 3, wherein the apparatus further comprises:
a plurality of third optical heads, each of which is inclined in a third direction, receiving the control signal, controlling the light and selectively supplying the light to a third set of the alignment regions of the alignment layer at a third angle of incidence; and
a plurality of fourth optical heads, each of which is inclined in a fourth direction different from the third direction, receiving the control signal, controlling the light and selectively supplying the light to a fourth set of the alignment regions of the alignment layer at a fourth angle of incidence different from the first, second, and third angles of incidence.

5. The apparatus of claim 4, wherein the third direction is an opposite direction from the fourth direction.

6. The apparatus of claim 2, wherein the optical heads each comprise a micromirror apparatus comprising a plurality of micromirrors selectively supplying the light from the light source to the alignment layer.

7. The apparatus of claim 6, wherein the pluralities of first and second optical heads each further comprise a multi-focal lens provided at a lower portion of the micromirror apparatus and adjusting a focus of the light supplied to the alignment layer.

8. The apparatus of claim 2, wherein the pluralities of first and second optical heads each comprise a lens apparatus comprising a fixed lens receiving the light from the light source and a movable lens receiving the light from the fixed lens and supplying the light to the alignment regions of the alignment layer.

9. The apparatus of claim 8, wherein the pluralities of first and second optical heads each further comprise a multi-focal lens provided at a lower portion of the lens apparatus and adjusting a focus of the light supplied to the alignment layer.

10. The apparatus of claim 1, wherein the light comprises a linearly-polarized ultraviolet (UV) light.

* * * * *